United States Patent [19]

Hafner et al.

[11] Patent Number: 4,630,638

[45] Date of Patent: Dec. 23, 1986

[54] ROTATING CAP, SCREEN AND MOUNTING MEANS FOR PROTECTING AIR METERING VALVE

[75] Inventors: V. Walter Hafner, Whittier; Ron T. Hahn, Fullerton; Keith D. Marshall, Whittier, all of Calif.

[73] Assignee: Acorn Engineering Company, City of Industry, Calif.

[21] Appl. No.: 823,392

[22] Filed: Jan. 28, 1986

[51] Int. Cl.⁴ ............................................. F16K 27/08
[52] U.S. Cl. .................................... 137/381; 137/377; 137/544; 251/215
[58] Field of Search ...................... 137/544, 377, 381; 251/310, 215, 48; 222/182

[56] References Cited

U.S. PATENT DOCUMENTS

| | | | |
|---|---|---|---|
| 3,216,624 | 11/1965 | Corsette | 222/182 |
| 4,164,241 | 8/1979 | Kubo | 137/377 |
| 4,221,204 | 9/1980 | Meyer | 251/54 |
| 4,271,095 | 6/1981 | Maeda | 137/382.5 |
| 4,307,748 | 12/1981 | Mathias | 137/381 |
| 4,445,530 | 5/1984 | Meixell | 137/381 |

Primary Examiner—A. Michael Chambers
Attorney, Agent, or Firm—Edgar W. Averill, Jr.

[57] ABSTRACT

An improved needle valve having a protective cap. The valve is of the type having an adjustable needle valve held in a housing connected to an air line. The needle valve meters air flow into a line and the improved valve has a cap with slits in the side thereof. The cap is oriented so that the slits face downwardly and, thus, any water or debris falling on the valve is conducted away from the air inlet portion of the valve. The valve is mounted so that it may be rotated 360 degrees about its point of mounting.

16 Claims, 5 Drawing Figures

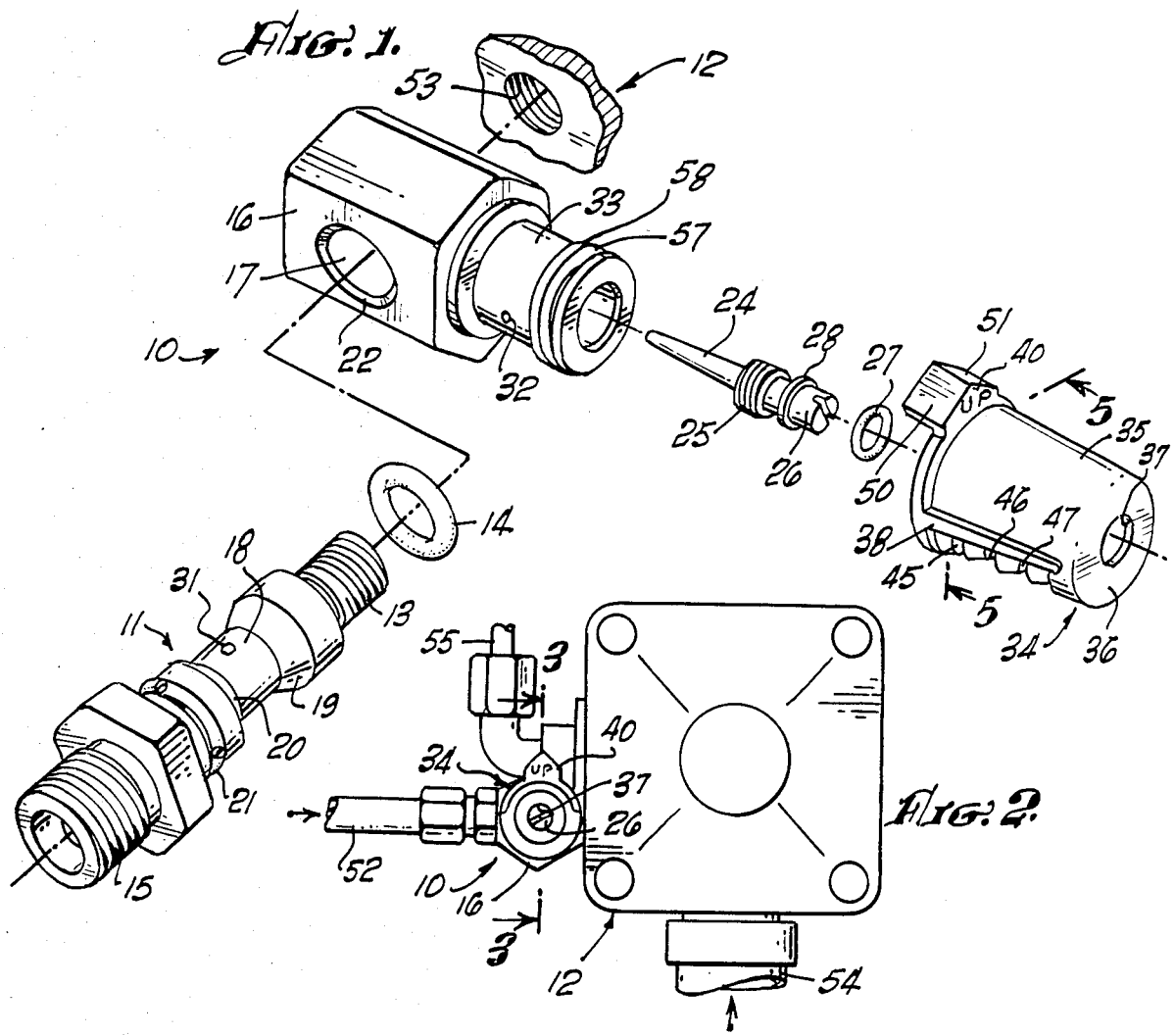
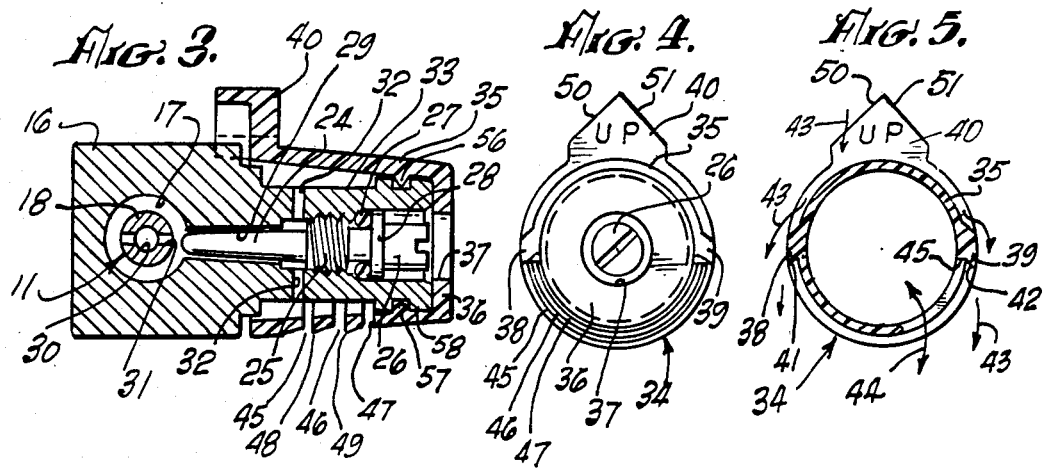

ROTATING CAP, SCREEN AND MOUNTING MEANS FOR PROTECTING AIR METERING VALVE

BACKGROUND OF THE INVENTION

The field of the invention is protective devices and the invention relates more particularly to shields and other covers for preventing water and other debris from fouling a device.

One type of remotely controlled valve operates by evacuating a measured volume of air through an air control line from a valve and then metering the air back into the line through a needle valve. The time required to meter in the entire evacuated volume of air is related to the time which the control device is preset. Although such devices work for long periods of time unattended in a clean environment, they are, unfortunately, easily caused to malfunction if the needle valve inlet is obstructed by water, dust or other foreign objects. The typical approach of providing a filter around the exterior of the valve has proved unsuccessful for preventing the intake of water falling from water leaks or condensation since the filter, over a relatively short period of time, can become soaked with water and clogged with debris. Furthermore, the cost of such filters is higher than desired.

SUMMARY OF THE INVENTION

It is an object of the present invention to provide a cap for protecting an air metering valve from liquid or foreign objects, which cap does not become readily clogged and which is low in cost.

The present invention is for an improved needle valve of the type useful for metering the flow of air into a valve control device, said needle valve being of the type having an adjustable needle held in a housing connected to an air line. The valve housing has an air inlet orifice which is protected by a cap with a generally cylindrical body, having a generally circular base with a distinctive marking protrusion thereon. The cylindrical body has a central axis and its generally cylindrical sidewall has at least one circumferentially oriented slit formed therein. The slit covers no more than about half of the circumference of the cap. Holding means are provided for holding the cap on the housing at a location so that the generally cylindrical sidewall extends over the air inlet orifice, and said holding means permits the rotation of the cap about the housing. Preferably, the needle valve is affixed to the controlled valve with a swivel or "banjo" type mounting. In a preferred embodiment, there are several slits in the cap and each slit terminates at each end with a downwardly directed point.

A BRIEF DESCRIPTION OF THE DRAWINGS

FIG. 1 is an exploded perspective view of the needle valve and protective cap of the present invention.

FIG. 2 is a plan view of a controlled device including the improved needle valve of FIG. 1.

FIG. 3 is a cross-sectional view taken along line 3—3 of FIG. 2.

FIG. 4 is a front view of the central portion of the needle valve of FIG. 1.

FIG. 5 is a cross-sectional view taken along line 5—5 of FIG. 1.

DESCRIPTION OF THE PREFERRED EMBODIMENTS

The needle valve is shown in exploded perspective view in FIG. 1 and indicated generally by reference character 10. Needle valve 10 is supported by a fitting 11 which is threaded into a controlled valve 12 at thread 13 and affixed to an air line at male threads 15. An O-ring 14 seals the fitting 11 at the controlled valve 12.

Needle valve 10 has a valve body housing 16 which has a bore 17 which contains the center core 18 and the conical portions 19 and 20 and abuts O-rings 21 and 14. O-ring 21 slides into bore 17 and forms an air-tight seal therein. Similarly, O-ring 14 forms an air-tight seal at the other end of bore 17. It is evident that valve housing 16 is capable of being rotated about fitting 11 to point in any of three hundred and sixty degrees with respect to the controlled valve body 12. Since such valves may be oriented in any direction, this ability is important for orientation of the cap which will be discussed below. This type of mounting will be referred to herein as a swivel type mounting.

Needle valve 10 has a needle 24, threads 25, an adjusting head 26 and an O-ring 27 which fits between threads 25 and shoulder 28. Needle 24 is held in needle valve opening 29 as shown in more detail in FIG. 3.

Air passing into or out of the central opening 30 of fitting 11 can flow through transverse opening 31 as shown more particularly in FIG. 3, and from there around the annular passageway between needle valve opening 29 and needle 24, and from there through a second transverse opening 32 which passes through a cylindrical extension 33 of housing 16, and from there is available to the atmosphere through cap 34.

For many designs of controlled valves, the time of control is equal to the time that it takes a measured volume of air to pass from the outside through needle valve opening 29 and from there to central opening 30 into the controlled valve 12. Since this causes air to be pulled in through transverse opening 32 as well as the annular passageway between needle 24 and opening 29, it is obvious that a small amount of foreign matter will greatly increase the amount of time that a volume of air takes to pass through this pathway. Thus, it is important that opening 32 and its related passageways be carefully protected and that is the function of cap 34.

Cap 34 is generally cylindrical in shape, although sidewall 35 is slightly frustro-conical as shown in the drawings. The outer end 36 of cap 34 has an opening 37 to permit the passage of a screwdriver to contact adjusting head 26 in a conventional manner. Cap 34 has a pair of shield ribs 38 and 39 and a marking protrusion 40 which for proper operation of the cap should be oriented upwardly as indicated by indicia on protrusion 40. Shield ribs 38 and 39 are shown in cross-sectional view in FIG. 5 where it can be seen that both ribs terminate in downwardly-facing points 41 and 42. Dirt and moisture indicated by arrows 43 run over the top of cap 34 and fall off at points 41 and 42 permitting the atmospheric air 44 to pass into the interior of cap 34 and from there into transverse opening 32. Cap 34 has three slits 45, 46 and 47 which are around a portion of the circumference although less than one-half thereof. It can also be seen that the portion of the cap between the slits is also angled and ends in points 48 and 49 to further reduce the likelihood that water will be pulled inwardly through the slits. Such downwardly-facing point is less likely to collect a drop of water than a similarly sized rib having a horizontal edge.

It can also be seen that marking protrusion 40 has a pair of slanted roof-like portions 50 and 51 which further helps to direct water outwardly from valve body housing 16, and more importantly from the space around cylindrical extension 33.

The installation of the improved control valve of the present invention is shown in front elevational view in FIG. 2 where air line 52 is threaded on fitting 11 in a conventional manner and fitting 11 is threaded onto the side of controlled valve 12 through threaded opening 53 shown in FIG. 1. Water under pressure is introduced to valve 12 through water line 54. After a volume of air has been withdrawn from air line 52 by means not shown, control valve 12 is opened and water passes through the water inlet line 54 and out of the water exit line 55. Meanwhile, air is being metered through transverse opening 32 and into the central opening 30 and into the controlled valve 12. After a predetermined amount of air has passed therethrough, valve 12 closes, stopping further flow of water. Such valves are particularly useful for institutional use such as for drinking fountains, hand-washing stations and other applications where valves are often carelessly left on creating unnecessary loss of water as well as energy in the event hot water is involved.

The cap of the present invention may be readily injection molded from a thermoplastic material such as acetal homopolymer, polyvinyl chloride or polyethylene. Cap 34 should be held on housing 16 in a manner which permits it to be readily rotated thereon. This is accomplished in various ways, but one particularly effective way is shown in the drawings where a "V-shaped" ridge 57 is formed on the inner surface in a circumferential manner of sidewall 35. Ridge 56 snaps into groove 57 on cylindrical extension 58 formed at the end of cylindrical extension 33. This readily permits the turning of cap 34 about its central axis.

While a "V-shaped" protrusion is indicated in the drawings as a marking indicia, other methods to mark the upward-orientation of cap 34 may be used. While the sidewalls are shown as slightly frustro-conical, they could, of course, be cylindrical and the term, "generally cylindrical," is used herein to include the slightly frustro-conical shape shown in the drawings. The term, "needle valve," has been used herein in its broadest sense and is intended to include any controlled, low flow volume air valve and not only valves using a needle valve.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. An improved needle valve of the type useful for metering the flow of air into a controlled device, said needle valve being of the type having an adjustable needle held in a housing connected to an air line, said housing having an air inlet orifice therein, wherein the improvement comprises:

a cap for protecting an air metering valve from liquid or foreign objects comprising:

a generally cylindrical body having a generally circular base having a distinctive marking protrusion thereon, said cylindrical body having a central axis and a generally cylindrical sidewall having at least one circumferentially oriented slit formed therein, said slit covering no more than about half of the circumference; and holding means for holding said cap on said housing at a location so that said generally cylindrical sidewall extends over said air inlet orifice of said housing, said holding means permitting the rotation of said generally cylindrical body about its central axis.

2. The improved needle valve of claim 1 wherein said housing is affixed to the fluid line in a swivel mounting manner.

3. The improved needle valve of claim 1 wherein there are a plurality of said circumferentially oriented slits.

4. The improved needle valve of claim 3 wherein there are three slits.

5. The improved needle valve of claim 1 wherein each end of said circumferentially oriented slits has a downwardly directed point when said central axis is horizontal and the slit is positioned in a downward direction.

6. The improved needle valve of claim 1 wherein said holding means comprises a groove formed in said housing and a circular circumferential protrusion formed on the inner surface of said generally cylindrical body.

7. The improved needle valve of claim 1 wherein said distinctive marking protrusion comprises a tab with a "V-shaped" point molded in the base of said generally cylindrical body.

8. The improved needle valve of claim 7 wherein said "V-shaped" point includes a downwardly extending skirt portion protruding past the lowermost portion of the body of said cap.

9. An improved needle valve of the type useful for metering the flow of air into a valve control device, said needle valve being of the type having an adjustable needle held in a housing connected to an air line, said housing having a cylindrical upper body portion having an air inlet orifice therein, wherein the improvement comprises:

a swivel type connection between said valve housing and said fluid line;

a cap for protecting an air metering valve from liquid or foreign objects comprising:

a frustro-conical body having a generally circular base, said frustro-conical body having a central axis and said body having at least one circumferentially oriented slit formed therein, said slit covering no more than about half of the circumference; and holding means for holding said cap on said housing at a location so that said generally frustro-conical sidewall extends over said air inlet orifice of said housing, said holding means permitting the rotation of said generally cylindrical body about its central axis.

10. The improved needle valve of claim 9 further including a distinctive marking protrusion on said frustro-conical body.

11. The improved needle valve of claim 10 wherein said distinctive marking protrusion is a generally "V-shaped" protrusion which extends outwardly and downwardly past the generally circular base.

12. The improved needle valve of claim 11 wherein there are a plurality of said slits.

13. The improved needle valve of claim 11 wherein each of said slits has a downwardly oriented point when the central axis of said cap is horizontal and said slit is on the lower side of said cap.

14. The improved needle valve of claim 9 wherein the upper end of said cap is partially closed and has an axially centered opening therethrough.

15. The improved needle valve of claim 9 wherein said holding means comprises an inner circumferential ridge on the inner surface of said frustro-conical body and a matching circumferential groove in said cylindrical upper body portion of said housing.

16. The improved needle valve of claim 9 further including a pair of longitudinal ridges on the exterior of said frustro-conical body at the edges of said slit.

* * * * *